United States Patent
Wang et al.

(10) Patent No.: US 10,528,479 B2
(45) Date of Patent: Jan. 7, 2020

(54) GLOBAL VARIABLE MIGRATION VIA VIRTUAL MEMORY OVERLAY TECHNIQUE FOR MULTI-VERSION ASYNCHRONOUS DYNAMIC SOFTWARE UPDATE

(71) Applicants: Kai-Ting Amy Wang, Toronto (CA); Peng Wu, Pittsford, NY (US)

(72) Inventors: Kai-Ting Amy Wang, Toronto (CA); Peng Wu, Pittsford, NY (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 88 days.

(21) Appl. No.: 15/612,602

(22) Filed: Jun. 2, 2017

(65) Prior Publication Data

US 2018/0349289 A1    Dec. 6, 2018

(51) Int. Cl.
*G06F 9/46* (2006.01)
*G06F 11/00* (2006.01)
(Continued)

(52) U.S. Cl.
CPC ............ *G06F 12/1027* (2013.01); *G06F 8/65* (2013.01); *G06F 9/44521* (2013.01);
(Continued)

(58) Field of Classification Search
CPC ............ G06F 11/0793; G06F 11/0712; G06F 11/3636; G06F 11/073; G06F 11/1466;
(Continued)

(56) References Cited

U.S. PATENT DOCUMENTS

| 5,442,758 A | * | 8/1995 | Slingwine | ................. G06F 9/52 707/799 |
| 5,951,672 A | * | 9/1999 | Kwok | ....................... G06F 9/52 710/200 |

(Continued)

FOREIGN PATENT DOCUMENTS

| CN | 102135894 A | 7/2011 |
| CN | 104461706 A | 3/2015 |

OTHER PUBLICATIONS

Changyeon Jo et al., Efficient Live Migration of Virtual Machines Using Shared Storage, Mar. 16-17, 2013, [Retrieved on Aug. 15, 2019]. Retrieved from the internet: <URL: http://delivery.acm.org/10.1145/2460000/2451524/p41-jo.pdf?> 10 Pages (41-50) (Year: 2013).*

(Continued)

*Primary Examiner* — Anibal Rivera (57) ABSTRACT

System and method for managing migration of global variables on processing system during live program updates, including creating a shared data segment is created in a physical memory of the processing system, binding a logical address space of a first global variable data segment for a first version of a program to a physical address of the shared data segment, and binding a logical address space for a second global variable data segment for an update version of the program to the physical address of the shared data segment. The first global variable data segment and the second global variable data segment exist concurrently and each map to common global variables stored in the shared data segment.

20 Claims, 5 Drawing Sheets

(51) Int. Cl.
| | |
|---|---|
| *G06F 17/30* | (2006.01) |
| *G06F 12/1027* | (2016.01) |
| *G06F 12/1009* | (2016.01) |
| *G06F 12/02* | (2006.01) |
| *G06F 8/65* | (2018.01) |
| *G06F 9/445* | (2018.01) |
| *G06F 12/1036* | (2016.01) |
| *G06F 9/4401* | (2018.01) |
| *G06F 9/52* | (2006.01) |
| *G06F 9/48* | (2006.01) |

(52) U.S. Cl.
CPC ...... *G06F 12/0261* (2013.01); *G06F 12/1009* (2013.01); *G06F 12/1036* (2013.01); *G06F 9/4405* (2013.01); *G06F 9/4843* (2013.01); *G06F 9/52* (2013.01); *G06F 2212/656* (2013.01); *G06F 2212/657* (2013.01)

(58) Field of Classification Search
CPC ........ G06F 9/52; G06F 9/526; G06F 9/45558; G06F 9/455; G06F 9/4405; G06F 9/4406; G06F 9/485; G06F 9/466; G06F 9/4843; G06F 3/0689; G06F 3/0605; G06F 8/656; G06F 8/54; G06F 8/456; G06F 17/30961; G06F 17/30958; G06F 8/658; G06F 8/443; G06F 8/68; G06F 9/50; G06F 9/484; G06F 9/445; G06F 9/327
See application file for complete search history.

(56) References Cited

U.S. PATENT DOCUMENTS

| | | | | |
|---|---|---|---|---|
| 6,088,044 | A * | 7/2000 | Kwok | G06F 9/50 345/504 |
| 6,598,108 | B1 * | 7/2003 | Ashida | G05B 19/0421 710/100 |
| 6,654,781 | B1 * | 11/2003 | Browning | G06F 9/4843 711/147 |
| 6,728,803 | B1 * | 4/2004 | Nelson | G06F 13/4022 370/398 |
| 6,877,016 | B1 * | 4/2005 | Hart | G06F 11/1466 |
| 7,007,027 | B2 * | 2/2006 | Najork | G06F 16/9024 707/722 |
| 7,072,904 | B2 * | 7/2006 | Najork | G06F 16/9027 |
| 7,843,906 | B1 * | 11/2010 | Chidambaram | H04L 47/6205 370/386 |
| 7,844,734 | B2 * | 11/2010 | Jiang | H04L 67/04 709/245 |
| 7,990,994 | B1 * | 8/2011 | Yeh | H04L 12/4641 370/431 |
| 8,230,085 | B2 * | 7/2012 | Roa | G06F 3/0605 709/229 |
| 8,286,238 | B2 * | 10/2012 | Durham | G06F 8/656 726/22 |
| 8,850,408 | B2 * | 9/2014 | Hinkle | G06F 11/3636 717/127 |
| 9,195,593 | B1 * | 11/2015 | Radovic | G06F 11/073 |
| 9,678,775 | B1 * | 6/2017 | Grover | G06F 8/456 |
| 9,996,401 | B2 * | 6/2018 | Gu | G06F 9/52 |
| 2003/0074487 | A1 * | 4/2003 | Akgul | G06F 9/4406 719/328 |
| 2004/0107416 | A1 * | 6/2004 | Buban | G06F 8/658 717/170 |
| 2005/0034014 | A1 * | 2/2005 | Moser | G06F 9/485 714/17 |
| 2007/0033659 | A1 * | 2/2007 | Hoche | G06F 8/443 726/28 |
| 2007/0198979 | A1 * | 8/2007 | Dice | G06F 9/466 718/100 |
| 2009/0150613 | A1 * | 6/2009 | Wang | G06F 12/0261 711/117 |
| 2009/0307438 | A1 * | 12/2009 | Logan | G06F 11/0712 711/153 |
| 2010/0023946 | A1 * | 1/2010 | McKenney | G06F 9/526 718/102 |
| 2011/0078427 | A1 * | 3/2011 | Shebanow | G06F 9/327 712/244 |
| 2012/0110237 | A1 * | 5/2012 | Li | G06F 9/45558 711/6 |
| 2013/0117766 | A1 * | 5/2013 | Bax | G06F 9/4405 719/323 |
| 2013/0219147 | A1 * | 8/2013 | Qiang | G06F 11/0793 711/209 |
| 2013/0262739 | A1 * | 10/2013 | Bennett | G06F 3/0689 711/102 |
| 2015/0081996 | A1 * | 3/2015 | Flood | G06F 12/0269 711/170 |
| 2015/0160940 | A1 * | 6/2015 | Hufnagel | G06F 8/65 717/168 |
| 2015/0277993 | A1 * | 10/2015 | Gu | G06F 9/52 718/102 |
| 2015/0339119 | A1 * | 11/2015 | Rehman | G06F 8/54 717/121 |
| 2016/0371105 | A1 * | 12/2016 | Sieffert | G06F 9/45545 |
| 2017/0344473 | A1 * | 11/2017 | Gidra | G06F 12/0261 |

OTHER PUBLICATIONS

Francois Gindraud et al., A bounded memory allocator for software-defined global address spaces, Jun. 14, 2016, [Retrieved on Aug. 15, 2019]. Retrieved from the internet: <URL: http://delivery.acm.org/10.1145/2930000/2926709/p78-gindraud.pdf?> 11 Pages (78-88) (Year: 2016).*

Arnold et al., "Ksplice: Automatic Rebootless Kernel Updates", https://pdos.csail.mit.edu/papers/ksplice:eurosys.pdf.

Hayden et al., Kitsune: Efficient, General-purpose Dynamic Software Updating for C, https://www.cs.umd.edu/~tedks/papers/2012-oopsla-kitsune.pdf.

https://github.com/MariaDB/server/blob/10.1/sql/handler.h#L1016.

* cited by examiner

GLOBAL VARIABLE MIGRATION VIA VIRTUAL MEMORY OVERLAY TECHNIQUE FOR MULTI-VERSION ASYNCHRONOUS DYNAMIC SOFTWARE UPDATE

TECHNICAL FIELD

The present invention relates to multi-version asynchronous dynamic software updates, and in particular to the migration of global variables during software updates.

BACKGROUND

Dynamic Software Update (DSU) procedures have been developed to allow code and data updates such as critical security patches and upgrades to be applied to a software program without downtime. Challenges can arise in managing global variables when performing a dynamic software update. Global variables are variables that are accessible to all the functions referenced in a program, are typically declared on top of all functions, and once declared they remain in memory throughout the runtime of the program.

When a program is first loaded, it is allocated a unique process address space in virtual memory that is mapped to a corresponding space in physical memory. The memory is used for executing instructions and storing data. In environments that support DSU, multiple versions of instructing code and data can be allocated different version address spaces within the process address space. Typically, a particular program version will have version address space allocated to it that will include space for instructing code and space for data. The address space for data can include a data segment assigned for global variables. Accordingly, in a DSU environment where multiple versions of a program may exist concurrently, multiple data segments that include the same global variables can occur, which can give rise to global variable management and migration issues.

This issue has been addressed in various ways in the past. For example, some DSU systems manage global variable migration by performing a memcpy to the address of a global variable in the data segment of a new program version from the address of the global variable in the data segment of the old program version. This requires that the new program version receive the addresses of the global variables in the data segment of the old program version and then access the global variable values via pointer dereferencing to get the values. Such a system requires that all program threads be quiesced during global variable migration to avoid race conditions for the variables. (See for example: Kitsune: Efficient, General-purpose Dynamic Software Updating for C; Christopher M. Hayden, Edward K. Smith, Michail Denchev, Michael Hicks, Jeffrey S. Foster; University of Maryland, College Park, USA; https://www-.cs.umd.edu/~tedks/papers/2012-oopsla-kitsune.pdf)

Other DSU systems attempt to prevent race conditions and/or mitigate thread migration risks by having the new version of the program manipulate the global variables in the old program version's data segment directly via pointers. A downside of this approach is that the new program version needs to reference the global variables via pointer redirection, which negatively impacts performance overhead. Further, this approach can mandate some recompilation of the new program's shared library components with a tool that manually transforms direct accesses to indirect accesses. In a plugin architecture where the premise is that third party plugin developers are only required to supply binary code, asking for source code for recompilation is not feasible.

Additionally, because a newer program version's code refers to the old version's data segment, one cannot simply dlclose the older version, even after all threads have migrated off the older version onto the new version.

Accordingly, there is a need for a DSU system that can facilitate global variable migration with out requiring system quiescing, does not require access to program source codes, and allows unused program versions to be de-allocated from the process address space.

SUMMARY

The present disclosure presents a dynamic software update (DSU) method and system for supporting global variable migration in the context of multi-threaded applications. The DSU system that is described is asynchronous in that an application environment does not have to be quiesced before a dynamic update can be applied.

According to a first example aspect is a method for managing migration of global variables on processing system during live program updates. The method includes creating a shared data segment in a physical memory of the processing system, binding a logical address space of a first global variable data segment for a first version of a program to a physical address of the shared data segment, and binding a logical address space for a second global variable data segment for an update version of the program to the physical address of the shared data segment. The first global variable data segment and the second global variable data segment exist concurrently and each map to common global variables stored in the shared data segment.

In some examples, the first version is loaded by the processing system and the update version is subsequently loaded by the processing system. When the first version is loaded, physical addresses are assigned in the shared data segment for a plurality of global variables referenced in the first version. Virtual addresses are included in the first global variable data segment that map to the global variables. When the update version is loaded, physical addresses are assigned in the shared data segment for the added global variables that are referenced in the update version and not the first version. Additionally, virtual addresses are included in the second global variable data segment that map to the physical addresses in the shared data segment for the common global variables referenced in both the first version and the update version as well as for the added global variables. Padding is included in virtual addresses of the second global variable data segment that map to the physical addresses of dropped global variables that are referenced in the first version but not the update version.

In some examples of the first aspect, a first linker-map is generated for the first version that identifies the global variables referenced in the first version and the addresses of the global variables. When the second version is loaded, the following are determined based on the first linker-map: (i) the added global variables that are referenced in the update version and not the first version; (ii) the common global variables referenced in both the first version and the update version; and (iii) the dropped global variables that are referenced in the first version but not the update version.

In example embodiments, the described method enables a first process thread and a second process thread concurrently active on the processing system to respectively execute the first version and the update version of the program, and the version update can be performed without quiescing the processing system.

In example embodiments, creating the shared data segment includes obtaining a shared memory file descriptor for the shared data segment. Binding the logical address space of the first global variable data segment comprises memory mapping the logical address space to the shared data segment based on the shared memory file descriptor, and binding the logical address space for the second global variable data segment comprises memory mapping the logical address space to the shared data segment based on the shared memory file descriptor.

According to a further aspect is a processing system configured to manage migration of global variables during live program updates. The processing system includes a processing device, a memory associated with the processing device, and a non-transient storage for storing instructions that when loaded to the memory and executed by the processing device cause the processing device to perform the method summarized above.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF ILLUSTRATIVE EMBODIMENTS

The present disclosure presents a system and method for supporting global variable migration during a dynamic software update (DSU). The disclosed system can be used to support global variable migration during program updates, including, among other things, plugin updates used by multi-threaded applications. The DSU support system that is described can in some applications support asynchronous DSUs in that an update can be done without quiescing. Although the presently described asynchronous DSU support system can be implemented in different environments, standard C-programming language syntax is used in this description to illustrate example embodiments.

Figure 1:
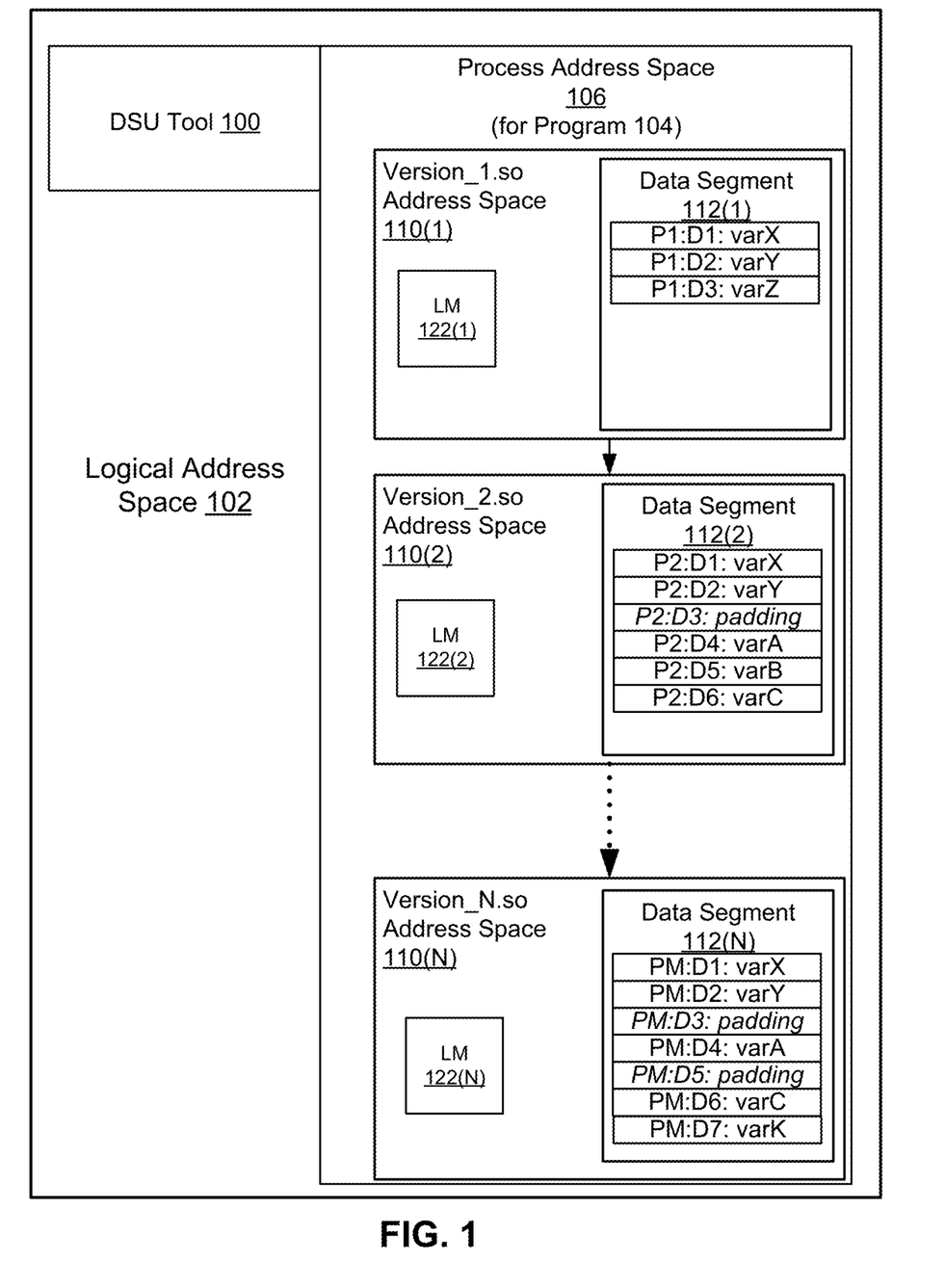
FIG. 1 is a schematic representation of address space assigned in accordance with a dynamic software update system according to example embodiments.

Referring to FIG. 1, examples of a DSU support system will be described in the context of a DSU tool 100 that supports a software program 104 that undergoes multiple program version updates (version_1.so to version_N.so). In particular, FIG. 1 represents virtual memory in the form of a logical address space 102 that has been defined by an operating system (OS) running on a processing system 400 (an example of which will be described in greater detail below). By way of non-limiting example, the OS may be a Linux or Windows OS. As illustrated in FIG. 1, logical address space 102 includes shared objects for implementing DSU tool 100. In some examples, DSU tool 100 is a plugin and is exposed as one or more application program interfaces (API's) that are accessible to programs in the logical address space 102.

When program 104 is loaded by the processing system 400 (for example through dynamic loading using the "dlopen" command), the OS allocates process address space 106 within the logical address space 102 for the program. In the described embodiment, program 104 is initially embodied as binary file "version_1". Loading version_1 includes compiling and linking processes that create a shared library "version_1.so" that includes executable code, data segments and other elements required for the program 104 runtime. The shared library version_1.so is allocated address space 110(1) within the process address space 106. The allocated address space 110(1) is divided into segments that can include, among other things, a text segment that stores the binary image of the executable process (for example, in an executable and linkable format (ELF)), and a data segment 112(1) that includes global variables referenced in the executable code.

Any global variables declared by the program 204 version_1.so are assigned space and stored within the global variable data segment 112(1). In this regard, FIG. 1 illustrates the contents of shared global variable data segment 112(1) after loading of the program 204 to create shared library version_1.so. In the illustrated example, three global variables have been declared by version_1.so, namely varX, varY and varZ. Each global variable has been assigned a respective address location in the global variable data segment 112(1), namely P1:D1; P1:D2; and P1:D3 where "PX" denotes a specific page in logical address space 102 (page "P1" in the illustrated example) and "DY" denotes a specific offset from the start of the specified page (offset "D1", "D2" and "D3", respectively in the illustrated example).

Figure 2:
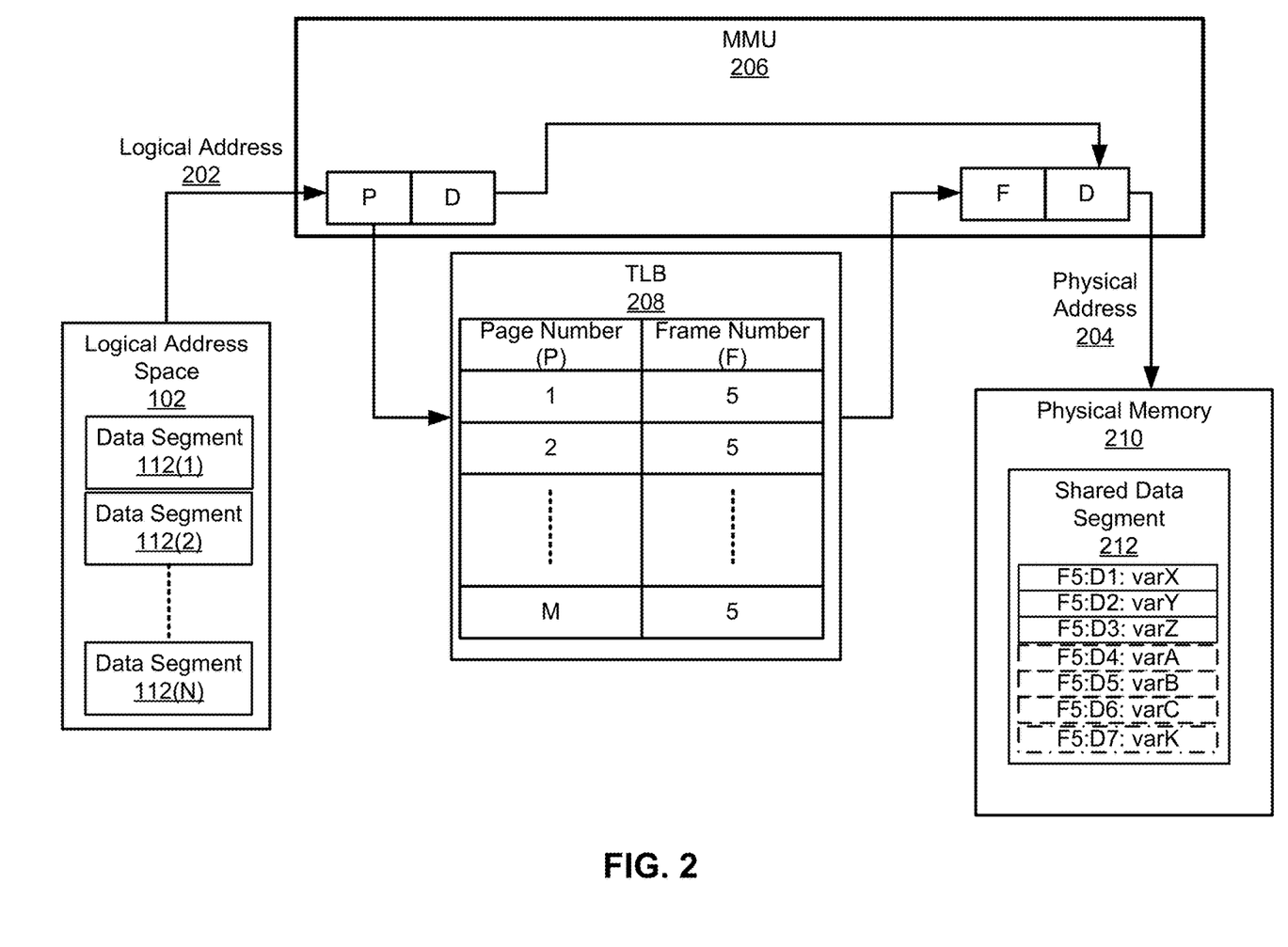
FIG. 2 shows a block diagram representation of multiple data segments in logical address space being mapped to a single shared data segment in physical memory, according to example embodiments.

Referring to FIG. 2, as known in the art, the logical address space 102 that is represented by the OS to running programs is a virtual representation of system physical memory 210. Typically, logical memory pages correspond in size to physical memory frames. Translation of logical addresses to physical addresses is performed by a memory management unit 206 operating in combination with a translation look-ahead buffer (TLB) 208. TLB 208 includes a translation table that links virtual address space page numbers to corresponding physical memory frames. As seen in FIG. 2, in the illustrated embodiment Memory Management Unit (MMU) 206 takes a logical address 202 that includes a page number P and offset D (P:D) from the OS, references the TLB 208 to get the physical memory frame number F that corresponds to the logical address space page number P, and combines the retrieved frame number F with the offset D to arrive at the physical memory address 204 (F:D).

In example embodiments, DSU tool 100 is configured to operate so that a shared global variable data segment 212 is created in physical memory 210 as the physical manifestation of the version_1.so data segment 112(1) from virtual address space 110(1). Furthermore, DSU tool 100 is configured to permit the shared global data segment 212 to function concurrently as the physical manifestation of the virtual address space data segments (data segments 112($i$), where $1 \leq i \leq N$) of multiple update versions (version_i.so, where $1 \leq i \leq N$) of program 104.

In order create and maintain shared global data segment 212, DSU tool 100 is invoked during the loading of version_1.so of program 104 and the subsequent updates as they become available. In this regard, as noted above, when the first version of program 104 (namely version_1.so) is initially loaded, any global variables declared by version_1.so are assigned space and stored within the global variable data segment 112(1). In an example embodiment, when the initial shared library version_1.so is created, DSU tool 100 is invoked, as part of the compiling and linking process, to create shared data segment 212 and bind it to a physical address in physical memory 212. In one example, this is done by using the "shm_open" function as follows:

//Create a shared memory segment
Int shm_fd=shm_open("version_1", O_CREAT | O_RDWR, 0666);

The function shm_open will return a shared memory file descriptor as variable shm_fd, binding the variable shm_fd to the physical memory address of a shared memory object (namely shared data segment 212). DSU tool 100 is configured to then bind the starting logical address of global variable data segment 112(1) to the physical memory address of shared data segment 212 using a memory mapping function such as the "mmap" function:

Void *ptr=mmap (edata—0x30, 4096, PROT_READ | PROT_WRITE, MAP_SHARED | MAP_FIXED, shm_fd,0);

Accordingly, once the initial shared library version iso is loaded and running, a logical incarnation of variable data segment 112(1) exists in version_1.so's logical address space 110(1), which is bound to shared data segment 212 in physical memory 210. In this regard, in the example illustrated in FIG. 2, as a result of the "shm_open" and "mmap" functions, shared data segment 212 will include the global variables declared by version iso, namely varX, varY and varZ, at respective physical memory addresses F5:D1; F5:D2; and F5:D3 (where FX denotes a specific frame of physical memory and DY denotes an offset within the frame), which are illustrated in solid boxes in FIG. 2. Furthermore, the shared memory file descriptor shm_fd will point to the physical address of shared data segment 212 (for example starting address F5:D1), and the logical memory page to physical memory frame translation table in TLB will specify that logical memory page "1" corresponds to physical memory frame "5". Any references to the global variables identified in variable data segment 112(1) during execution of version_1.so effectively point to the relevant shared memory data segment 212 in physical memory 210.

As known in the art, as part of the linking process that occurs during the creation of a shared library such as version iso, the linker can be configured to dump (e.g., generate) a corresponding linker-map. Thus, in example embodiments, during creation of shared library version_1.so, a corresponding linker-map is generated (represented in FIG. 1 as linker-map LM 122(1)) that identifies the global variables referenced in version iso and the logical addresses of those variables in logical address space 102.

As indicated above, during its runtime program 104 progresses through multiple software updates from version_1 to version_2, and so on to version_N, resulting in corresponding shared librariesversion_1.so, version_2.so, and so on to version_N.so. In this regard, the DSU tool 100 supports global variable migration during live updates of versions of program 104 as such updates become available, enabling concurrent versions of the program 104 to make use of the shared data segment 212 in physical memory 210. The operation of DSU tool 100 during a program update from version iso to program 104 version_2.so will now be described with reference to FIGS. 1 through 3. A program version update can be triggered in different ways, including through a manual trigger or by way of an update signal (for example SIGUSR) when the update is available.

Figure 3:
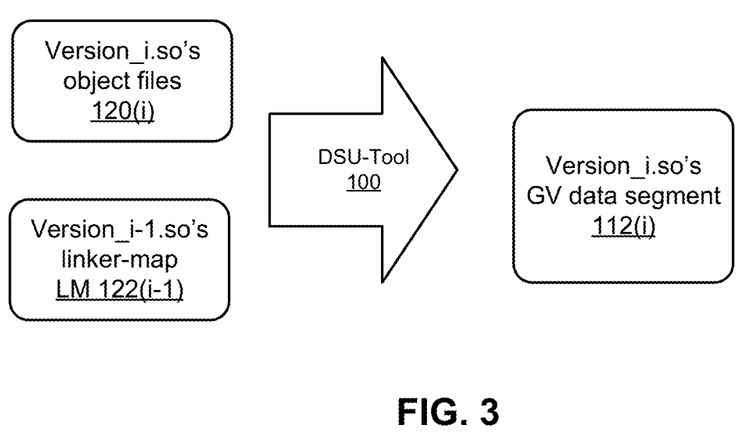
FIG. 3 represents aspects of a program version update according to example embodiments.

When the updated version_2.so is dynamically loaded, it is also allocated version specific address space 110(2) within the process address space 106. As noted above, the allocated address space 110(2) is divided into segments that can include, among other things, a text segment that stores the binary image of the executable process, and a global variable data segment 112(2) that includes global variables referenced in the executable code. For illustrative purposes, some of the global variables referenced in version_1.so are not referenced in version_2.so, and some new global variables are referenced in version_2.so that are not referenced in version_1.so. In the specific example shown, global variables varX and varY migrate between the versions but global variable varZ has been dropped from version_2.so, and new global variables varA, varB and varC have been added. Accordingly, global variable data segment 112(2) includes global variables varX, varY, varA, varB and varC, but not varZ. Referring to FIG. 3, the DSU tool 100 is invoked during the compiling and linking of update version_2.so to bind the global variable data segment 112(2) to the physical memory 210 location of shared data segment 212 using the shared memory file descriptor stored in variable shm_fd. In an example embodiment, this is done using a memory mapping function such as the "mmap" function:

Void *ptr2=mmap (edata2—0x30, 4096, PROT_READ | PROT_WRITE, MAP_SHARED | MAP_FIXED, shm_fd,0);

As part of the compiling and linking process, the DSU tool 100 is configured to access the object files corresponding to the current version_i.so (e.g. version_2 in the present example) and the linker map LM 122(i−1) of the immediately preceding version_i−1.so (e.g. Linker-map MP 122(1) of version_1.so in the present example) to determine how the global variables have changed between versions and to determine the addresses of the global variables in the preceding data segment 112(i−1) (e.g. data segment 112(1) in the present example). The DSU tool 100 uses this information to ensure that global variables from the previous version_1.so that have been dropped do not get overwritten in shared data segment 212 by new global variables from the currently added update version_2.so. This is illustrated by considering, with reference to FIG. 1, the version_1.so global variable data segment 112(1) and the version_2.so global variable data segment 112(2) in the logical environment of process address space 106 within the physical memory 210 shared data segment 212 shown in FIG. 2. In the illustrated example, DSU tool 100 recognizes that the first two global variables varX and varY in data segment 112(1) have migrated from version_1.so to version_2.so, and causes the first two logical addresses (P2:D1 and P2:D2) in global variable data segment 112(2) to be assigned by the OS to these variables. In the illustrated example, data segment 112(2) uses addresses having a different logical page (page P2 rather than page P1) than data segment 112(1) of the earlier version_1.so, but the relative offsets (D1, D2) remain the same.

DSU tool 100 also recognizes that the third global variable varZ from version_1.so is no longer being used, and that the global variables varA, varB, and varC have been added. In order to avoid a conflict between the logical memory addresses in data segment 112(2) and the physical memory of shared data segment 212, DSU tool 100 creates padding in the logical global variable data segment 112(2), after which the new variables are added. By way of example, as shown in FIG. 1, the address location P2:D3 in data segment 112(2) that corresponds to the address location P1:D3 of data segment 112(1) is padded, and the new variables varA, varB and varC assigned the next three available addresses P2:D4, P2:D5, P2:D6 of data segment 112(2). In the context of physical memory 210, as indicated by the dashed boxes in FIG. 2, the three new variables varA, varB and varC are added to corresponding locations (F5:D4, F5:D5, F5:D6) at the end of the shared data segment 212. As a result of the binding done through memory mapping function (mmap) described above, the translation table of TLB 208 links the logical address page P2 to physical memory frame number F5. Accordingly, the data segment 112(1) that occupies logical addresses P1:D1 (varX), P1:D2 (varY) and P1, D3 (varZ) and the data segment 112(2) that occupies logical addresses P2:D1 (varX), P2:D2 (varY), P2:D4 (varZ) both are linked through TLB 208 to the same shared data segment 212 in physical memory 210.

At the completion of the opening of version_2.so, both version iso and version_2.so and their respective global variable data segments 112(1), 112(2) exist in logical process address space 106 of program 104, and both version_1.so and version_2.so share physical memory locations in the shared data segment 212 for the migrated variables varX and varY. The memory address for varZ remains available for the use of version_1.so without the risk of being overwritten by version_2.so. Previously unused address locations are used in shared data segment 212 for the new variables varA, varB, and varC. The migrated global variables varX and varY are capable of being read and updated by a process thread that is still executing old version iso or by a process thread that is executing the new version_2.so; a process thread executing the old version_1.so can read and update varZ, however a process thread executing version_2.so will be unaware of varZ; and a process thread executing the new version_2.so can read and update varA, varB and varC, however a process thread executing the old version_1.so will be unaware of varA, varB and varC.

Additionally, as part of the linking process that occurs during of the creation of shared library version_2.so, the linker is configured to generate corresponding version_2.so's linker-map (represented in FIG. 1 as linker-map LM 122(2)). Linker_map 122 (2) identifies the global variables referenced in the program version_2.so and the logical addresses of those variables in data segment 112(2). Linker-map 122(2) can then be used by DSU tool 100 as the basis for the next version update to repeat the update process described above.

In the illustrated example, data segment 112(N) represents the logical address space data segment for the shared library version_N.so corresponding to the Nth version update updateof program 104. As can be seen in FIGS. 1 and 2, because version_2.so, the variable varB has been dropped and new variable varK added. In data segment 112(N), padding has been added to the addresses to skip over virtual address location PM:D5, and in logical address space data segment 112(N) and physical memory data segment 212 the new variable varK has been added to the end of the data segment at offset location D7. In TLB 208, the logical page number "M" of the data segment 112(N) (along with the page numbers of the prior version data segments 112(1) and 112(2)) maps to the physical frame number "5" used for the shared data segment 212.

In example embodiments, when a prior version shared library version_i.so is no longer used by any process threads, the shared library can be closed (for example using dlclose) and the virtual address space and physical address space uniquely allocated for the version can be deallocated without impacting the global variables stored in shared data segment 212.

As will be appreciated from the above description, in example embodiments DSU tool 100 enables global state migration by mapping the virtual address of the data segment for new program versions onto the same physical address that the older data segment or prior program version is mapped onto. Multiple new versions' virtual data segment addresses can point to the same physical address of a shared global data segment 212. DSU tool 100 does not require copying of data segments between versions, but rather uses memory sharing and memory mapping to manipulate TLB address mapping. The described approach can mitigate race conditions, because it uses one physical storage that is pointed to by multiple virtual addresses. Further, the need to quiesce any process threads during updates is eliminated because regardless of which version_i.so a process thread is executing, the required global variables are present in shared data segment 212. Additionally, DSU tool 100 enables an environment in which global variable migration is handled when a new version is compiled and linked without requiring plugin developers to modify their code or provide non-binary code.

As described above, addition and deletion of global variables can be performed without quiescing system process threads still running various older program versions. At link time of an update to version_i.so, DSU tool 100 uses the linker-map 122(i-1) of the prior version version_i-1.so to adjust the layout of global variables inside the virtual data segment 112(i) of the current version. In particular, DSU tool 100 takes the linker-map 122(i-1) produced by the immediate previous version_i-1.so, as well as the object files from the current shared library version_i.so, and invokes the system linker to create the virtual data segment 112(i) and update the shared data segment 212 for current shared library version_i.so. In doing so, the DSU tool 100 effectively pushes all the newly created variables to the end of the virtual data segment 112(i) and the physical data segment 212, and allocates padding space in the virtual data segment 112(i) to preserve spaces in the physical data segment 212 for variables that were there in the previous versions. Accordingly, version_0.so, version_1.so and version_N.so can all concurrently be in used inside the system by some threads.

Figure 4:
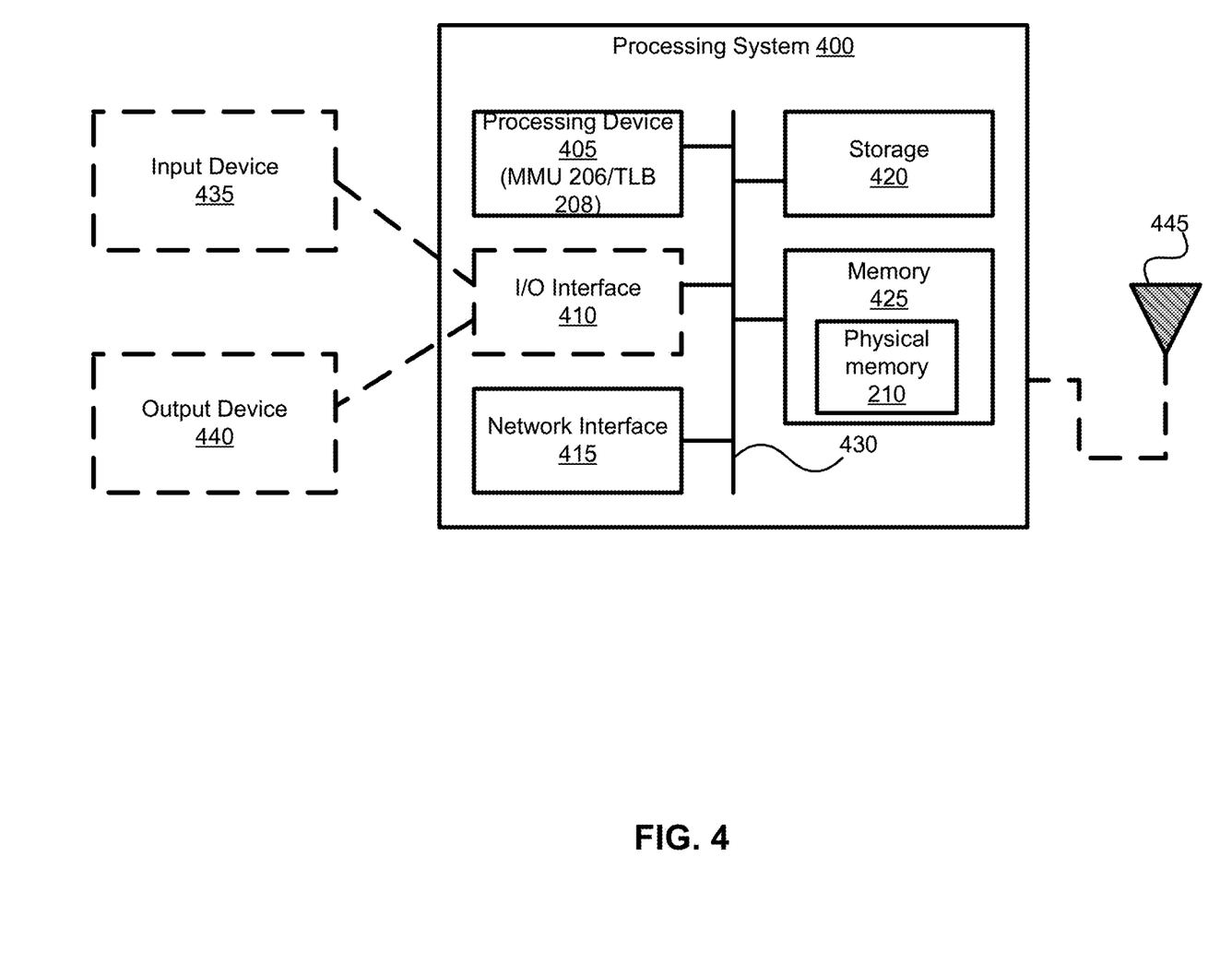
FIG. 4 is a schematic representation of a processing system used to implement the asynchronous dynamic software update system of FIG. 1.

FIG. 4 is a schematic diagram of an example processing system 400, which may be used to implement the methods and systems disclosed herein. The processing system 400 may be a server or base station, for example, or any suitable computing system. Other processing systems suitable for implementing examples described in the present disclosure may be used, which may include components different from those discussed below. Although FIG. 4 shows a single instance of each component, there may be multiple instances of each component in the processing system 400 and the processing system 400 could be implemented using parallel and/or distributed systems.

The processing system 400 may include one or more processing devices 405, such as a processor, a microprocessor, an application-specific integrated circuit (ASIC), a field-programmable gate array (FPGA), a dedicated logic circuitry, an MMU 206 and TLB 208, or combinations thereof. The processing system 400 may also include one or more optional input/output (I/O) interfaces 410, which may enable interfacing with one or more appropriate input devices 435 and/or output devices 440. The processing system 400 may include one or more network interfaces 415 for wired or wireless communication with a network (e.g., an intranet, the Internet, a P2P network, a WAN and/or a LAN) or other node. The network interfaces 415 may include one or more interfaces to wired networks and wireless networks. Wired networks may make use of wired links (e.g., Ethernet cable), while wireless networks, where they are used, may make use of wireless connections transmitted over an antenna such as antenna 445. The network interfaces 415 may provide wireless communication via one or more transmitters or transmit antennas and one or more receivers or receive antennas, for example. In this example, a single antenna 445 is shown, which may serve as both transmitter and receiver. However, in other examples there may be separate antennas for transmitting and receiving. In embodiments in which processing system is a network controller, such as an SDN Controller, there may be no wireless interface, and antenna 445 may not be present in all embodiments. The processing system 400 may also include one or more storage units 420, which may include a mass storage unit such as a solid state drive, a hard disk drive, a magnetic disk drive and/or an optical disk drive.

The processing system 400 may include one or more memories 425 that can include physical memory 210, which may include a volatile or non-volatile memory (e.g., a flash memory, a random access memory (RAM), and/or a read-only memory (ROM)). The non-transitory memories 425 (as well as storage 420) may store instructions for execution by the processing devices 405, such as to carry out methods such as those described in the present disclosure. The memories 425 may include other software instructions, such as for implementing an operating system (OS), the DSU tool 100, and other applications/functions. In some examples, one or more data sets and/or modules may be provided by an external memory (e.g., an external drive in wired or wireless communication with the processing system 400) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 430 providing communication among components of the processing system 400. The bus 430 may be any suitable bus architecture including, for example, a memory bus, a peripheral bus or a video bus. Optionally, input devices 435 (e.g., a keyboard, a mouse, a microphone, a touchscreen, and/or a keypad) and output devices 440 (e.g., a display, a speaker and/or a printer) are shown as external to the processing system 400, and connected to optional I/O interface 410. In other examples, one or more of the input devices 435 and/or the output devices 440 may be included as a component of the processing system 400. Embodiments in which processing system 400 is a network controller may lack a physical I/O interface 410, and instead may be a so-called headless server for which all interactions are carried out through a connection to network interface 415.

Figure 5:
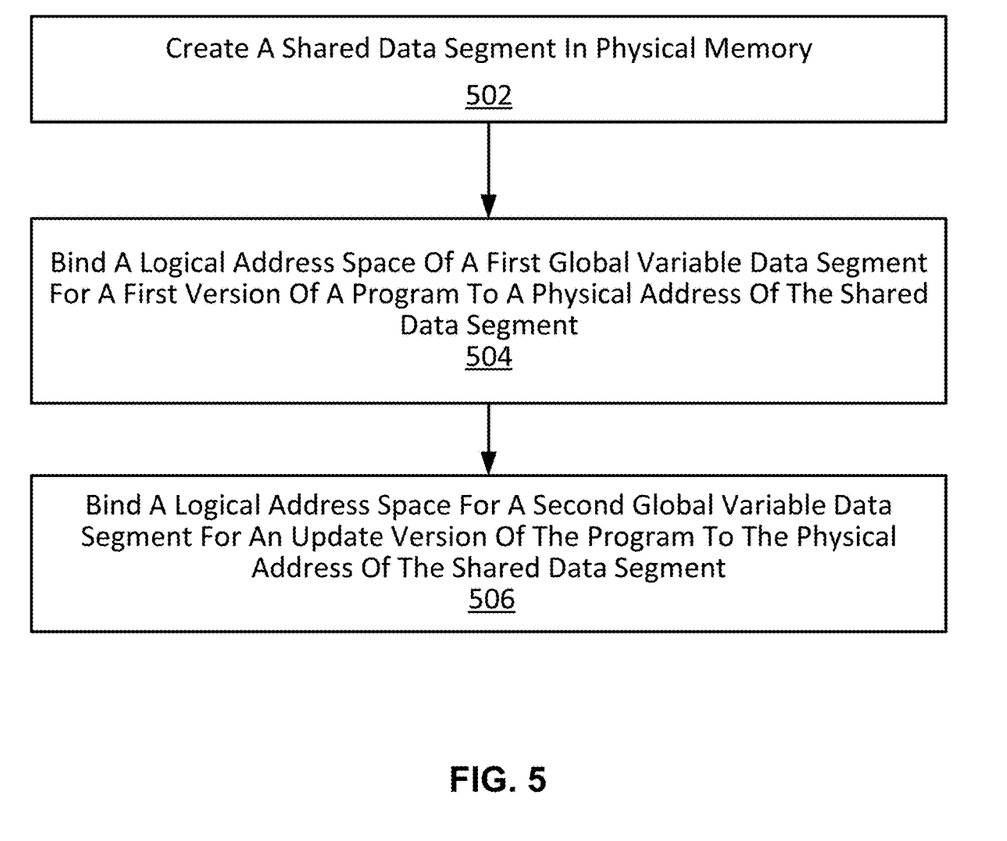
FIG. 5 is a block diagram of a method carried out on the processing system of FIG. 4 according to example embodiments.

FIG. 5 illustrates an example of a method implemented according to the above described embodiments for managing migration of global variables on processing system 400 during live program updates. In at least some examples, instructions that cause the processing device 405 to carry out the method shown in FIG. 5 are stored in storage 420 of the processing system 400. The method includes creating a shared data segment 212 in a physical memory 210 of the processing system 400 (step 502), binding a logical address space 110(1) of a first global variable data segment 112(1) for a first version (version_1.so) of a program 104 to a physical address 204 of the shared data segment 212 (step 504); and binding a logical address space 110(2) for a second global variable data segment 112(2) for an update version (version_2.so) of the program 104 to the physical address 204 of the shared data segment (step 506). The first global variable data segment 112(1) and the second global variable data segment 112(2) exist concurrently and each map to common global variables stored in the shared data segment 212.

In example embodiments, the first version (version_1.so) is loaded by the processing system 400 and the update version (version_2.so) is subsequently loaded by the processing system 400. When the first version (version_1.so) is loaded, physical addresses are assigned in the shared data segment 212 for a plurality of global variables (varX, varY, varZ) referenced in the first version (version_1.so). Virtual addresses are included in the first global variable data segment 112(1) that map to the global variables (varX, varY, varZ). When the update version (version_2.so) is loaded, physical addresses are assigned in the shared data segment 212 for the added global variables (varA, varB, varC) that are referenced in the update version (version_2.so) and not the first version (version_1.so). Additionally, virtual addresses are included in the second global variable data segment 112(2) that map to the physical addresses in the shared data segment 212 for the common global variables (varX, varY,) referenced in both the first version and the update version as well as for the added global variables (varA, varB, varC). Padding is included in virtual addresses of the second global variable data segment 112(1) that map to the physical addresses of dropped global variables (varZ) that are referenced in the first version (version_1.so) but not the update version (version_2.so).

In some example embodiments, a first linker-map 122(1) is generated for the first version (version_1.so) that identifies the global variables (varX, varY, varZ) referenced in the first version and the addresses of the global variables. When the second version (version_2.so) is loaded, the following are determined based on the first linker-map 122(1): (i) the added global variables (varA, varB, varC) that are referenced in the update version and not the first version; (ii) the common global variables (varX, varY) referenced in both the first version and the update version; and (iii) the dropped global variables (varZ) that are referenced in the first version but not the update version.

In example embodiments, the described method enables a first process thread and a second process thread concurrently active on the processing system 400 to respectively execute the first version (version_1.so) and the update version (version_2.so) of the program 104, and the version update can be performed without quiescing the processing system 400.

In example embodiments, creating the shared data segment 212 in step 502 includes obtaining a shared memory file descriptor for the shared data segment 212. Binding the logical address space 110(1) of the first global variable data segment 112(1) in step 504 comprises memory mapping the logical address space to the shared data segment 212 based on the shared memory file descriptor, and binding the logical address space 110(2) for the second global variable data segment 112(2) comprises memory mapping the logical address space to the shared data segment 212 based on the shared memory file descriptor.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

Certain adaptations and modifications of the described embodiments can be made. Therefore, the above discussed embodiments are considered to be illustrative and not restrictive. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for managing migration of global variables on a processing system during live program updates, comprising:
   creating a shared data segment in a physical memory of the processing system;
   when a first version of a program is loaded by the processing system:
      allocating a logical address space for a first global variable data segment for a first version of a program and binding the first global variable data segment to the shared data segment;
      assigning physical addresses in the shared data segment for a plurality of global variables referenced in the first version of the program; and
      including virtual addresses in the first global variable data segment that map to the plurality of global variables;
   when an update version of the program is subsequently loaded by the processing system and is executed concurrently with the first version:
      allocating a logical address space for a second global variable data segment for the update version of the program and binding the second variable data segment to the shared data segment;
      assigning physical addresses in the shared data segment for added global variables that are referenced in the update version and not the first version;
      including virtual addresses in the second global variable data segment that map to the physical addresses in the shared data segment for common global variables referenced in both the first version and the update version, and
      including virtual addresses in the second global variable data segment that map to the physical addresses in the shared data segment for the added global variables;

wherein the first global variable data segment for the first version of the program and the second global variable data segment for the update version of the program exist concurrently, and the first and second global variable data segments each map to the common global variables stored in the shared data segment.

2. The method of claim 1 comprising, when the update version is loaded, including padding in virtual addresses of the second global variable data segment that map to the physical addresses of dropped global variables that are referenced in the first version but not the update version.

3. The method of claim 2 comprising:
   generating, for the first version, a first linker-map that identifies the global variables referenced in the first version and the virtual addresses that map to the global variables;
   determining, based on the first linker-map: (i) the added global variables that are referenced in the update version and not the first version; (ii) the common global variables referenced in both the first version and the update version; and (iii) the dropped global variables that are referenced in the first version but not the update version.

4. The method of claim 1 wherein a first process thread executing the first version is active concurrently with a second process thread executing the second version on the processing system, wherein the first process thread accesses the plurality of global variables, stored in the shared data segment, referenced in the first version, and the second process thread accesses the common global variables and the added global variables, stored in the shared data segment, referenced in the update version.

5. The method of claim 4 wherein the first process thread keeps accessing the plurality of global variables without quiescing when the second process thread accesses the common global variables and the added global variables.

6. The method of claim 1 wherein creating the shared data segment comprises obtaining a shared memory file descriptor for the shared data segment.

7. The method of claim 6 wherein binding the first global variable data segment to the shared data segment comprises memory mapping the first global variable data segment to the shared data segment based on the shared memory file descriptor, and binding the second global variable data segment to the shared data segment comprises memory mapping the first second variable data segment to the shared data segment based on the shared memory file descriptor.

8. The method of claim 2 further comprising adding new variables in the padding when loading a version subsequent to the update version.

9. A processing system configured to manage migration of global variables during live program updates, comprising:
   a processing device;
   a memory associated with the processing device;
   a non-transient storage for storing instructions that when loaded to the memory and executed by the processing device cause the processing device to:
   create a shared data segment in the memory;
   when a first version of a program is loaded by the processing system:
      allocate a logical address space for a first global variable data segment for a first version of a program and bind the first global variable data segment to the shared data segment;
      assign physical addresses in the shared data segment for a plurality of global variables referenced in the first version of the program; and include virtual addresses in the first global variable data segment that map to the plurality of global variables;

when an update version of the program is subsequently loaded by the processing system and is executed concurrently with the first version:

allocate a logical address space for a second global variable data segment for an update version of the program and bind the second global variable data segment to the shared data segment;

assign physical addresses in the shared data segment for added global variables that are referenced in the update version and not in the first version;

include virtual addresses in the second global variable data segment that map to the physical addresses in the shared data segment for common global variables referenced in both the first version and the update version, and include virtual addresses in the second global variable data segment that map to the physical addresses in the shared data segment for the added global variables;

wherein the first global variable data segment for the first version of the program and the second global variable data segment for the update version of the program exist concurrently, and the first and second global variable data segments each map to the common global variables stored in the shared data segment.

10. The processing system of claim 9 wherein the stored instructions cause the processing device to, when the update version is loaded, include padding in virtual addresses of the second global variable data segment that map to the physical addresses of dropped global variables that are referenced in the first version but not the update version.

11. The processing system of claim 10 wherein the stored instructions cause the processing device to:

generate, for the first version, a first linker-map that identifies the global variables referenced in the first version and virtual addresses of the global variables;

determine, based on the first linker-map: (i) the added global variables that are referenced in the update version and not the first version; (ii) the common global variables referenced in both the first version and the update version; and (iii) the dropped global variables that are referenced in the first version but not the update version.

12. The processing system of claim 9 wherein a first process thread executing the first version is active concurrently with a second process thread executing the second version on the processing system, wherein the first process thread accesses the plurality of global variables, stored in the shared data segment, referenced in the first version, and the second process thread accesses the common global variables and the added global variables, stored in the shared data segment, referenced in the update version.

13. The processing system of claim 9 wherein the stored instructions cause the processing device to obtain a shared memory file descriptor for the shared data segment.

14. The processing system of claim 13 wherein the stored instructions cause the processing device to: bind the first global variable data segment to the shared data segment by memory mapping the logical address space to the shared data segment based on the shared memory file descriptor, and bind the second global variable data segment to the shared data segment by memory mapping the logical address space to the shared data segment based on the shared memory file descriptor.

15. The processing system of claim 10 wherein the stored instructions cause the processing device to, add new variables in the padding when loading a version subsequent to the update version.

16. A computer program product comprising a non-transient storage medium storing instructions managing migration of global variables on a processing system comprising instructions to cause a processing device to:

create a shared data segment in a physical memory of the processing system;

when a first version of a program is loaded by the processing system:

allocate a logical address space for a first global variable data segment for a first version of a program and bind the first global variable data segment to the shared data segment;

assign physical addresses in the shared data segment for a plurality of global variables referenced in the first version of the program; and include virtual addresses in the first global variable data segment that map to the plurality of global variables;

when an update version of the program is subsequently loaded by the processing system and is executed concurrently with the first version:

allocate a logical address space for a second global variable data segment for an update version of the program and bind the second global variable data segment to the shared data segment;

assign physical addresses in the shared data segment for added global variables that are referenced in the update version and not in the first version;

include virtual addresses in the second global variable data segment that map to the physical addresses in the shared data segment for common global variables referenced in both the first version and the update version, and include virtual addresses in the second global variable data segment that map to the physical addresses in the shared data segment for the added global variables;

wherein the first global variable data segment for the first version of the program and the second global variable data segment for the update version of the program exist concurrently, and the first and second global variable data segments each map to the common global variables stored in the shared data segment.

17. The computer program product of claim 16 wherein the stored instructions cause the processing device to, when the update version is loaded, include padding in virtual addresses of the second global variable data segment that map to the physical addresses of dropped global variables that are referenced in the first version but not the update version.

18. The computer program product of claim 17 wherein the stored instructions cause the processing device to:

generate, for the first version, a first linker-map that identifies the global variables referenced in the first version and virtual addresses of the global variables;

determine, based on the first linker-map: (i) the added global variables that are referenced in the update version and not the first version; (ii) the common global variables referenced in both the first version and the update version; and (iii) the dropped global variables that are referenced in the first version but not the update version.

19. The computer program product of claim 16 wherein the stored instructions cause the processing device to: obtain a shared memory file descriptor for the shared data segment;
bind the first global variable data segment to the shared data segment by memory mapping the logical address space to the shared data segment based on the shared memory file descriptor; and bind the second global variable data segment to the shared data segment by memory mapping the logical address space to the shared data segment based on the shared memory file descriptor.

20. The computer program product of claim 16 wherein a first process thread executing the first version is active concurrently with a second process thread executing the second version on the processing system, wherein the first process thread accesses the plurality of global variables, stored in the shared data segment, referenced in the first version, and the second process thread accesses the common global variables and the added global variables, stored in the shared data segment, referenced in the update version.

\* \* \* \* \*